Figures 1, 2:
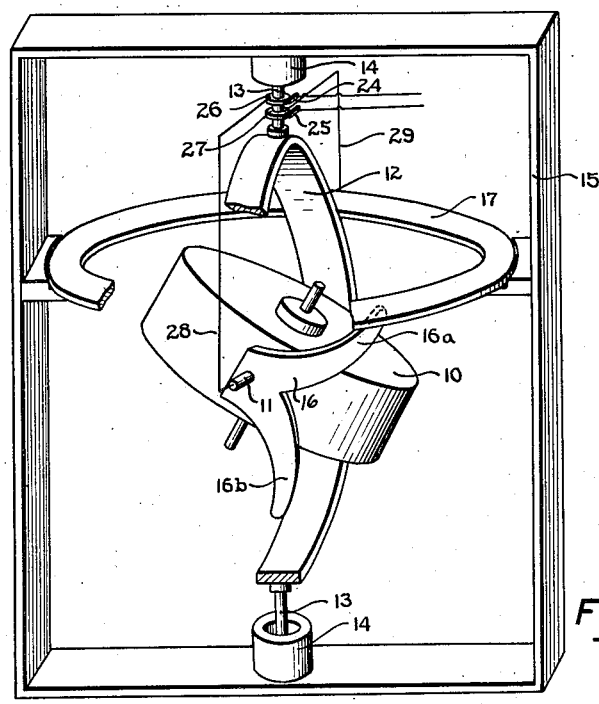

May 19, 1942.  H. BRANDT  2,283,720

GYROSCOPE

Filed April 13, 1940

INVENTOR
Hermann Brandt
BY
Stephen Cerstvik
ATTORNEY

Patented May 19, 1942

2,283,720

UNITED STATES PATENT OFFICE 2,283,720

GYROSCOPE

Hermann Brandt, Berlin-Charlottenburg, Germany, assignor to Siemens Apparate und Maschinen Gesellschaft mit beschränkter Haftung, Berlin, Germany, a corporation of Germany Application April 13, 1940, Serial No. 329,549
In Germany September 15, 1936

3 Claims. (Cl. 74—5)

This invention relates to gyroscopes, and more particularly to means for controlling movements of a gyroscopic suspension.

Gyro devices have heretofore been proposed for use, for example, as directional indicators for vehicles such as aircraft, suitable rotors of such gyros being suspended in gimbal rings and adapted for high angular velocities. When it is desired to take the gyro out of operation, the flow of motive energy thereto is interrupted, and there arise, because of the deceleration of the rotor mass, certain retardation moments which act upon the shaft upon which the rotor rotates. In directional gyros, when such interruption occurs, the axis of rotation of the rotor becomes tilted from its position which is normally perpendicular to the plane of the gimbal ring trunnions. This tilting can produce conditions which greatly endanger the apparatus because the rotation of the rotor may be transmitted to portions of the gimbal ring suspension. As a result, such portions of the gimbal ring suspension might be placed in such rapid rotation that there is created a danger of destruction of the device.

One of the objects of the present invention is to provide a gyroscopic device in which danger of self-destruction or self-damage, due to rapid rotation of a mounting of said device, is eliminated.

Another object of the invention is to provide novel means for preventing the rotation of a gyro rotor from being transmitted to a mounting for said rotor.

A further object is to provide novel means for preventing rapid rotation of a gimbal ring mounting for a gyro rotor.

The above and further objects and novel features will more fully appear when the following detailed description is read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the views:

Fig. 1 is a view in perspective with parts broken away of one embodiment of the invention; and Fig. 2 is a perspective view of a second embodiment of the invention.

The form of the invention illustrated in the accompanying drawing, by way of example, comprises motion control means for use with a gyro rotor in gimbal ring suspension, the latter having inner and outer gimbal trunnions. The motion control means are adapted to act as a stop for limiting angular motion of the axis of rotation of the gyro rotor in two planes. Not only does the device act as a limit-stop, but also as a brake. The motion control means comprises a stationary annular member, which preferably surrounds the gimbal ring suspension, and which is engageable by a member mounted for movement with said inner trunnions. When the movable member contacts the surface of the annular member, tilting movement of the rotor about the axis of the inner trunnions is arrested. If the rotation of the gyro is now transmitted to the gimbal ring which supports said inner trunnions, the movable member moves along the surface of the annular member, and a braking action occurs between the members which tends to retard and to arrest rotation of said gyro and ring about the axis of the outer trunnions.

In Fig. 1, a gyro rotor is mounted in a conventional gimbal ring mounting comprising a rotor housing 10 having horizontal trunnions 11 which rest upon a gimbal ring 12. The latter is provided with vertical trunnions 13 which are mounted in bearings 14 upon a stationary support 15.

The above gyro device is employed, for example, as a direction establishing means and under normal operating conditions the axis of rotation of the rotor extends perpendicular to a plane formed by the axes of inner trunnions 11 and outer trunnions 13. In other words, the rotor axis is normally horizontal.

If the gyro is to be stopped, the flow of a power medium thereto is interrupted. Certain moments act upon the rotor due to a deceleration thereof which cause the axis of rotation to move away from the horizontal and to tilt relative to the above mentioned perpendicular position.

Consequently, there arises a likelihood that the rotation of the gyro rotor will be transmitted to the gimbal ring, thereby causing the latter to turn in the direction of rotation of the rotor. This rotation of the gimbal ring should it reach a high velocity can damage said ring, displace the adjustment of the mounting, or cause a destruction of the entire device. In order to avoid such rotation, means are provided for retarding angular motion of the gimbal ring, which means in the form shown, are operable when the axis of rotation of the rotor has moved a predetermined amount from its normal horizontal position. On the inner gimbal trunnion is mounted a brake member 16 having arms 16a, 16b which are preferably separated by approximately 90°, and which extend in both directions toward which the gyro rotor can tilt about the axis of the inner trunnions. Another brake member is provided which is adapted to coact with the one first mentioned, comprising, for example, an annular surface or circular member 17 which preferably surrounds the gimbal ring and is in a plane preferably perpendicular to the axis of trunnions 13. Member 17 is mounted upon the stationary support 15. One of the arms 16a or 16b is adapted for engaging member 17 when a tilting of the rotor occurs in one direction, e. g., clockwise, and the other of the arms is so adapted when a tilt occurs in the other direction.

Suitable means are provided for conducting electrical energy to the gyro rotor for driving the latter comprising, in the form shown, brushes 24 and 25 which are connected to a source of electrical energy (not shown) and which respectively engage slip rings 26 and 27. Ring 26 is connected by a lead 28 to a suitable contact device (not shown) upon one of the trunnions 11, through which energy is conveyed to the gyro rotor. Ring 27 is analogously connected to the opposite trunnion 11 by a lead 29.

In operation, when the inner gimbal trunnions angularly shift a predetermined amount, due to a tilting of the axis of rotation of the rotor, one of the two arms 16a or 16b will engage member 17, thus preventing further angular movement of the trunnions 11. If the gimbal ring starts to turn because of an angular moment transmitted thereto from the gyro rotor, the arm 16a or 16b coacting with member 17 will "brake" or retard such an angular motion of the gimbal ring. The effectiveness of the braking action increases as a function of the pressure of the arm 16 upon member 17.

A second embodiment of the invention is illustrated in Fig. 2 comprising an electrically driven gyro rotor in gimbal ring suspension, which suspension is similar to that shown in Fig. 1. The electricity conducting means to the gyro rotor shown in Fig. 2 are also similar to that shown in Fig. 1. The second embodiment instead of being provided with brake arm 16a and 16b, which engage a ring when the gyro rotor axis moves out of the horizontal by a predetermined amount, is provided with a brake 37 which engages a brake drum 38 upon one of the outer trunnions 13. Brake 37 is pivotally attached at 36 upon a rigidly mounted electromagnet 31 having a winding 30 thereon which by means of leads 32, 33 is connected to leads 22, 23, which in turn are respectively connected to brushes 24 and 25. A suitable switch S is interposed between a source of electric energy 21, the electro-magnet and the gyro.

The brake arm 37 is urged toward the drum 38 by means of a spring 39 which is disposed at a point opposite to coil 30 with reference to pivot point 36.

In operation, the switch S is normally maintained in the position shown during which time electricity flows to both the gyro rotor and to the electro-magnet 31. The brake arm 37 is attracted by the electro-magnet and held out of engagement with the drum 38 during the period of energization of magnet 31. However, if switch S is opened so that the flow of energy is interrupted, the coil 30 of the electro-magnet 31 will become deenergized, and the spring 39 will be effective to move the arm 37 in a clockwise direction into engagement with drum 38, thereby clamping gimbal ring 12 in position and preventing any rotation thereof about the axis of trunnions 13.

There is thus provided novel means for preventing rapid rotation of a gimbal ring which supports a gyro rotor. The means are simple, rugged, and inexpensive to manufacture. The novel means can be constructed in such a manner that the braking action occurs at any predetermined angular movement of the axis of rotation of the gyro rotor from a predetermined position.

Although only two embodiments of the invention has been illustrated and described in detail, it is to be expressly understood that the invention is not limited thereto.

Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. A directional gyroscope for aircraft comprising a gimbal ring having inner and outer trunnions, the outer trunnions mounting the gimbal ring for rotation about a vertical axis within a member rigidly mounted in the aircraft, a second gimbal ring mounted upon said inner trunnions within said first gimbal ring for pivotal movement about a horizontal axis, a rotor mounted within said second gimbal ring for spinning about a normally horizontal axis perpendicular to said first horizontal axis, an annular member secured within and carried by the first member and defining a braking surface coaxial with the outer trunnions, and a braking member comprising two oppositely disposed arms mounted upon one of said inner trunnions for tilting movement in one direction about said first horizontal axis in response to the tilting movement of the rotor spin axis during a deceleration in the spinning of said rotor whereby one of said arms engages the annular member to brake tilting movement of the rotor spin axis in said one direction, said braking member being mounted for tilting movement in an opposite direction whereby the other of said arms engages the annular member to brake the tilting movement of the rotor spin axis in said opposite direction.

2. A directional gyroscope for aircraft comprising a gimbal ring having inner and outer trunnions, the outer trunnions mounting the gimbal ring for rotation about a vertical axis within a member rigidly mounted in the aircraft, a second gimbal ring mounted upon said inner trunnions within said first gimbal ring for pivotal movement about a horizontal axis, a rotor mounted within said second gimbal ring for spinning about a normally horizontally axis perpendicular to said first horizontal axis, an annular member secured within and carried by the first member and defining a braking surface coaxial with the outer trunnions, and a braking member comprising two oppositely disposed arms mounted upon one of said inner trunnions for tilting movement in one direction about said first horizontal axis in response to the tilting movement of the rotor spin axis during a deceleration in the spinning of said rotor whereby one of said arms engages the annular member to brake tilting movement of the rotor spin axis in said one direction, said braking member being mounted for tilting movement in an opposite direction whereby the other of said arms engages the annular member to brake the tilting movement of the rotor spin axis in said opposite direction, the annular member and the braking member further defining means for preventing rotation of the first gimbal ring about said vertical axis due to tilting movement of the rotor spin axis.

3. A directional gyroscope for aircraft comprising a gimbal ring having inner and outer trunnions, the outer trunnions mounting the gimbal ring for rotation about a vertical axis within a member rigidly mounted in the aircraft, a second gimbal ring mounted upon said inner trunnions within said first gimbal ring for pivotal movement about a horizontal axis, a rotor mounted within said second gimbal ring for spinning about a normally horizontal axis perpendicular to said first horizontal axis, an annular member secured within and carried by the first member and defining a braking surface coaxial with the outer trunnions, and a braking member comprising two arms separated from each other approximately 90° mounted upon one of said inner trunnions for tilting movement in one direction about said first horizontal axis in response to tilting movement of the rotor spin axis during a deceleration in the spinning of said rotor whereby one of said arms engages the annular member to brake tilting movement of the rotor spin axis in said one direction, said braking member being mounted for tilting movement in an opposite direction whereby the other of said arms engages the annular member to brake the tilting movement of the rotor spin axis in said opposite direction, the annular member and the braking member further defining means for preventing rotation of the first gimbal ring about said vertical axis due to tilting movement of said rotor spin axis.

HERMANN BRANDT.